United States Patent Office 3,377,854
Patented Apr. 16, 1968

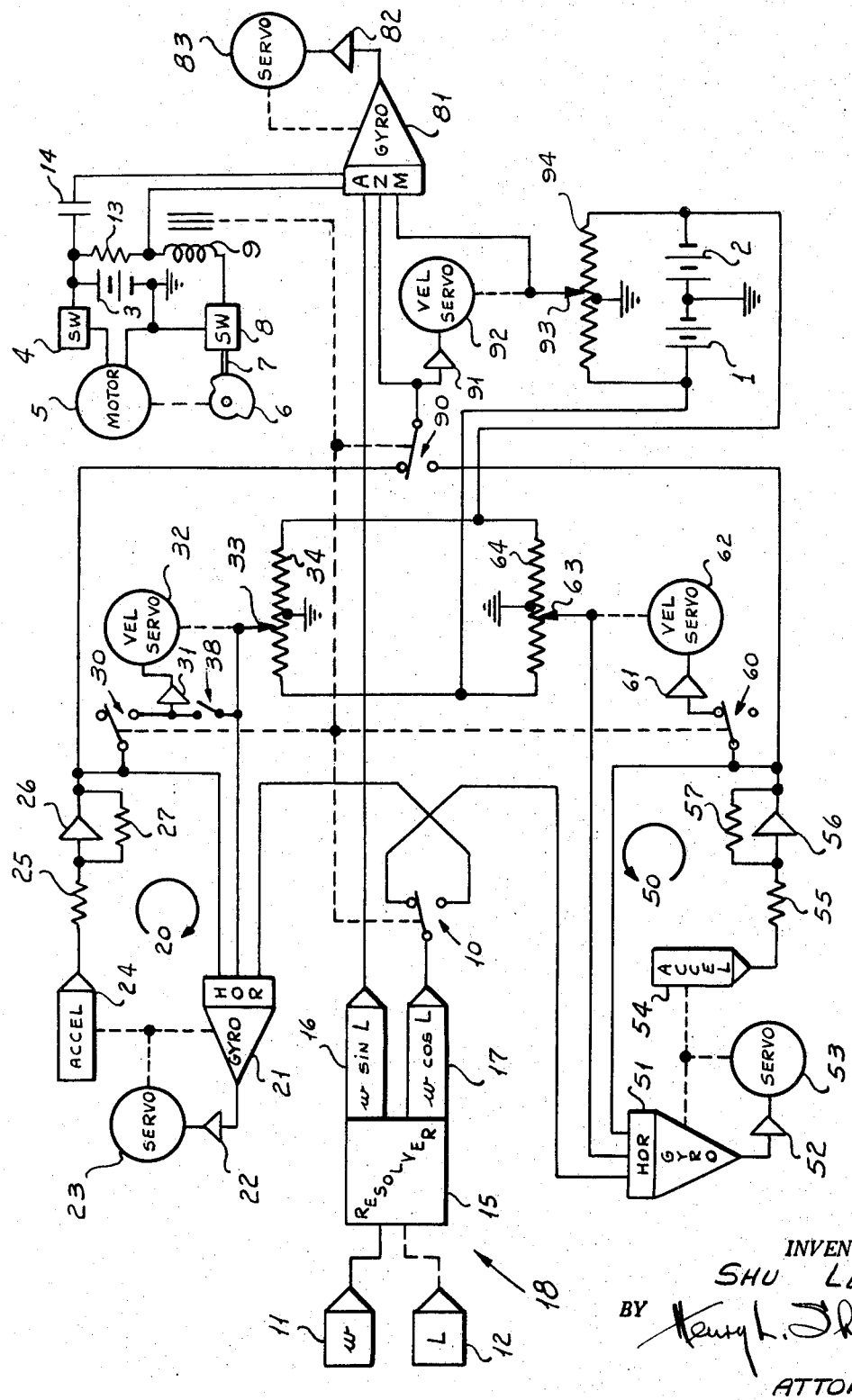

3,377,854
INERTIAL PLATFORM TRIMMING SYSTEM
Shu Lee, Scarsdale, N.Y., assignor to United Aircraft Corporation, East Hartford, Conn., a corporation of Delaware
Continuation of application Ser. No. 80,805, Jan. 5, 1961. This application May 26, 1964, Ser. No. 372,140
22 Claims. (Cl. 73—178)

My invention relates to an inertial platform trimming system and more particularly to an automatic trimming system for an inertial platform having single-degree-of-freedom gyroscopes which substantially eliminates gyroscope drift. This application is a continuation of my copending application for Inertial Platform Trimming System filed Jan. 5, 1961, Ser. No. 80,805, now abandoned.

In the prior art gyro drift has been calculated or experimentally determined and signals to correct for such drift have been introduced into the gyroscope. However, such methods of compensating for gyro drift do not take into consideration the fact that the drift rate of gyros changes from day to day and a value of calculated or experimentally determined gyro drift for one day will not apply for succeeding days.

I have invented an automatic trimming system for an inertial platform in which trimming is accomplished while the gyros are mounted on the platform. No external or auxiliary equipment is required and the gyros need not be removed from the platform.

One object of my invention is to provide an inertial platform trimming system which automatically compensates for and eliminates gyro drift.

Another object of my invention is to provide a self-trimmed inertial platform which does not require the use of auxiliary external equipment.

A further object of my invention is to provide an inertial platform trimming system in which the gyros remain fixed on the platform and need not be removed for the purpose of trimming.

Other and further objects of my invention will appear from the following description.

In general my invention contemplates the provision of a conventional inertial platform provided with a first and a second gyroscope. The first and second gyroscopes have orthogonally disposed input axes lying in a nominally horizontal plane. The platform is provided with a first accelerometer having a sensitive axis parallel to the input axis of the second gyroscope and a second accelerometer having a sensitive axis parallel to the input axis of the first gyroscope. The first accelerometer is connected to torque the first gyroscope; and the second accelerometer is connected to torque the second gyroscope. The platform is further provided with an azimuth gyroscope having a vertical input axis which is nominally aligned with the earth's gravitational vector. Into the gyroscopes are introduced appropriate torquing signals which rotate the platform in accordance with the earth's rate of rotation. In the absence of gyro drift the accelerometers cause the platform to maintain a local horizontal attitude. If the sensitive axis of the first accelerometer and the input axis of the second gyroscope are aligned with North, no earth rate is sensed by the first gyroscope. I couple the output of the first accelerometer to the azimuth gyro which in turn forces the platform to maintain, as a gyro-compass, the Northerly orientation of the sensitive axis of the first accelerometer. No earth rate torquing signal need by introduced into the first gyroscope. I integrate the output of the first accelerometer and apply such integrated signal to the azimuth gyro. I integrate the output of the second accelerometer and couple such integrated signal to the second gyroscope. With the configuration thus far described, the platform, that is the plane determined by the axes of the gyroscope and accelerometers, will assume a local horizontal attitude; but the axes of the first accelerometer and second gyroscope will deviate from true North proportionally to the drift in the first gyroscope which controls gyro-compassing. The integrated signal applied to the azimuth gyro will, however, entirely compensate for drift in such gyro. The integrated signal coupled to the second gyro will eliminate the major portion of drift in such gyro. However, a residual drift error remains which varies as the square of the error in the Northerly orientation of the sensitive axis of the first accelerometer. Generally the residual drift in the second gyro will be extremely small compared with its normal drift. Accordingly, as a first approximation it may be assumed that the second gyro is drift-free. I now cause the second accelerometer to control the azimuth gyro and disable the integrator associated with the second gyro to maintain the existing drift correction signal. I now integrate the output of the first accelerometer and couple such integrated signal to the first gyro. I switch the earth rate torquing signal from the second gyro to the first gyro. The platform will now rotate in a horizontal plate through 90° about the vertical input axis of the azimuth gyro so that the sensitive axis of the second accelerometer, which is parallel to the input axis of the first gyroscope, is substantially aligned with North. Since the second gyroscope is substantially free of drift, the error in alignment of the sensitive axis of the second accelerometer with North will be very small; and the first gyroscope will be compensated almost completely for drift, since its residual drift varies as a square of the extremely small angular error from North in the sensitive axis of the second accelerometer. I may then restore all connections to their original condition, whereupon the platform returns to its initial orientation with the sensitive axis of the first accelerometer now in substantially perfect alignment with North, since the first gyroscope is now compensated almost completely for drift. By such alternate switching back and forth between the two conditions, the residual drift in the first and second gyros converges very rapidly upon zero as the number of switching operations is increased.

The accompanying drawing which forms part of the instant specification and is to be read in conjunction therewith is a schematic view showing one embodiment of my invention.

Referring now to the drawing, I provide a conventional stabilized platform well known to the art as shown, for example, in the Sutherland Patent 2,955,474 upon which are mounted a gyro 21 having a horizontal input axis, a gyro 51 having an orthogonally disposed horizontal input axis, a linear accelerometer 24 having a sensitive axis parallel to the input axis of gyro 51, a linear accelerometer 54 having a sensitive axis parallel to the input axis of gyro 21, and an azimuth gyro 81 having a vertical input axis aligned with that of the earth's gravitational vector. Gyros 21, 51, and 81 are single-degree-of-freedom gyroscopes which provide an output signal whenever the gimbal deviates from its null position. The gyroscopes are further provided with input windings which, as well known to the art, produce torques about the gimbal or output axis. The output signal of the gyro 21 is coupled to an amplifier 22 which drives a servomotor 23. Servo 23 controls the attitude of the platform about the input axis of gyro 21. Accelerometer 24 is also responsive to the component of gravity which accompanies a platform tilt about the input axis of gyro 21. The output of accelerometer 24 is coupled through an input resistor 25 to the input terminal of a high-gain feedback amplifier 26. The output of amplifier 26 is coupled through a feedback resistor 27 to its input terminal. The output of amplifier 26 is also coupled to one torquing input of horizontal gyro 21. The closed loop 20 includes a horizontal gyro 21 and accelerometer 24. The output signal of horizontal gyro 51 is coupled to an amplifier 52 which drives a servomotor 53. Servomotor 53 controls the attitude of the platform about the input axis of gyro 51, to which tilts accelerometer 54 is responsive by virtue of the resulting gravity component. The output of accelerometer 54 is coupled through an input resistor 55 to the input of a high-gain feedback amplifier 56, the output of which is coupled to its input through a feedback resistor 57. The output of amplifier 56 is coupled to one torquing input of horizontal gyro 51. The closed loop 50 includes accelerometer 54 and horizontal gyro 51. The mechanical arrangement forms no part of my invention. I may employ various configurations well-known to the art such as one shown in the Sutherland Patent 2,955,474. I provide a navigation computer indicated generally by the reference numeral 18, which includes a resolver 15. I provide an electrical input 11 to resolver 15 which is precisely scaled to represent the earth rate $w$. I provide a mechanical input 12 to resolver 15 which represents the known latitude $L$ of the platform on the surface of the earth. In the particular embodiment of my invention shown, the platform is at rest relative to the earth and has no translational velocity. Resolver 15, having inputs $w$ and $L$, computes the quantity 16 representing the product $w \sin L$, and the quantity 17 representing the product $w \cos L$. The quantity 16 is coupled to one torquing input of azimuth gyro 81. The quantity 17 is coupled to the armature of a double-pole, single-throw switch indicated generally by the reference numeral 10. The upper contact of switch 10 is connected to a second torquing input of horizontal gyro 51. The lower contact of switch 10 is connected to a second torquing input of horizontal gyro 21. The output of amplifier 26 is coupled to the upper contact of a single-pole, double-throw switch indicated generally by the reference numeral 90. The armature of switch 90 is connected to a second torquing input of azimuth gyro 81. The lower contact of switch 90 is connected to the output of amplifier 56. The signal at the armature, switch 90, is coupled to an amplifier 91 which drives a velocity servo 92. The output shaft of velocity servo 92 rotates at a speed proportional to the signal existing at the armature of switch 90. The output shaft of velocity servo 92 drives a brush 93 of a potentiometer 94. Brush 93 is connected to a third input of azimuth gyro 81. The output of amplifier 26 is connected to the armature of a switch indicated generally by the reference numeral 30. The lower contact of switch 30 is connected to an amplifier 31 which drives a velocity servo 32. The output shaft of velocity servo 32 moves with an angular speed proportional to the input signal of amplifier 31. The output shaft of velocity servo 32 drives a brush 33 associated with potentiometer 34. The brush 33 is connected to a third input of horizontal gyro 21. The input of amplifier 31 may be connected by means of a manually operable normally open switch, indicated generally by the reference numeral 38 to brush 33. The output of amplifier 56 is connected to the armature of a switch indicated generally by the reference numeral 60. The upper contact of switch 60 is connected to an amplifier 61 which drives a velocity servo 62. The output shaft of velocity servo 62 moves with a speed proportional to the signal existing at the input of amplifier 61. The output shaft of velocity servo 62 drives a brush 63 associated with a potentiometer 64. Brush 63 is connected to a third input of horizontal gyro 51. I provide batteries 1 and 2 for generating a stable drift-free reference voltage. The negative terminal of battery 1 and the positive terminal of battery 2 are grounded. The positive terminal of battery 1 is connected to one terminal of each of potentiometers 34, 64, and 94. The negative terminal of battery 2 is connected to the other terminal of each of potentiometers 34, 64, and 94. Each of potentiometers 34, 64, and 94 is provided with a center tap which is connected to ground. Switches 10, 30, 60, and 90 are all controlled by a relay actuating winding 9. The upper contact of switch 30 and the lower contact of switch 60 have no connections. I provide a constant-speed timing motor 5 which is supplied by a battery 3 through a manually operable switch 4. Battery 3 also excites relay winding 9 in series with a resistor 13 through a normally closed micro-switch 8 having an actuating arm 7. Timing motor 5 drives a cam 6 upon which rides micro-switch actuating arm 7. In the position of cam 6, as shown, micro-switch 8 is open circuited. Relay actuating winding 9 is not energized, which causes switches 10, 30, 60, and 90 to be in their upper positions, as shown.

In the upper position of switches 10, 30, 60, and 90, as shown, loop 20, including gyro 21 and accelerometer 24, controls azimuth gyro-compass 81. Accordingly the platform rotates azimuthally in seeking a null of the earth rate component about the input axis of gyro 21 so that loop 20 will be responsive to north-south platform tilts, while loop 50, including horizontal gyro 51 and accelerometer 54, will be responsive to east-west platform tilts. An earth rate signal is introduced only into loop 50 and not into loop 20.

In operation of my inertial platform trimming system, switch 38 is closed, causing the signal at brush 33 to drive the velocity servo 32 until the signal is nulled and the output at brush 33 is zero. Switch 38 is then opened. Since the drift of gyro 21 is unknown, it would be undesirable that any drift compensating signal be present at brush 33. Switch 4 is then closed, energizing timing motor 5, which drives cam 6 at a constant speed. The signals from amplifier 56 and from brush 63 introduced into gyro 51 cause the platform to stabilize with no east-west tilt by virtue of the earth rotation compensating signal from resolver 15 which is also coupled to gyro 51. The output signal of amplifier 26 applied through switch 90 to azimuth gyro-compass 81 and the integrated signal at brush 93 causes the platform to orient itself very close to true north. The error from true north is that necessary to subject horizontal gyro 21 to an earth rate influence sufficient to completely cancel the drift in gyro 21, whereupon loop 20 will have no north-south tilt. The entire drift correction for azimuth gyro-compass 81 will be supplied at brush 93, since the outputs of accelerometer 24 and amplifier 26 are zero. The major portion of drift compensation for gyro 51 will be supplied from brush 63. However, a second-order residual, uncompensated drift will exist in horizontal gyro 51 due to the error in northerly orientation of the platform necessary to cancel the drift in gyro 21. During the period in which the platform settles down to a fixed orientation which is only slightly in error from true north and in which the platform settles down to a completely level condition with no tilt, timing motor 5 rotates cam 6 counterclockwise. Micro-switch 8 now closes, energizing winding 9 and drawing the armatures of switches 10, 30, 60, 90 into engagement with the lower contacts. This immediately opens switch 60 thereby disabling velocity servo 62 and maintaining at brush 63 the voltage which almost exactly cancels the drift in gyro 51. The earth rate correction is disconnected from gyro 51 and connected to gyro 21. The actuation of switch 90 causes loop 50 to control azimuth gyro-compass 81. The closing of switch 30 enables velocity servo 32 to provide drift corrections to gyro 21. The platform turns gradually through 90°, so that loop 50 is responsive to north-south tilts and loop 20 is responsive to east-west tilts. Loop 50 has very little residual gyro drift. Accordingly, the northerly orientation of the platform is now substantially better than before, when the switches were in their upper position, since gyro 51 is subjected only to that earth rate influence necessary to cancel its residual second-order drift. The platform stabilizes with no tilt and with the signal at brush 33 substantially eliminating drift in gyro 21. The trimming operation may now be stopped by opening switch 4, if the latitude of the earth-slaved platform is appreciably less than 90°. However, at very high latitudes, it may be desirable to perform an additional half-cycle of operation. If switch 4 is left closed, then timing motor 5 will continue to rotate cam 6, opening micro-switch 8 and de-energizing winding 9. The armatures of switches 10, 30, 60, and 90 are returned to their upper position, as shown, where loop 20 controls gyro-compassing. The platform now turns gradually back 90° to its original orientation where loop 20 is responsive to north-south tilts and loop 50 is responsive to east-west tilts. The convergence is extremely rapid at the lower latitudes so that only two half-cycles of switching are required. The convergence is sufficiently rapid even at the highest latitudes that gyro drift as a practical matter may be completely eliminated in three or four half-cycles of switching back and forth.

In order to speed up the platform turn through 90° upon each opening or closing of micro-switch 8, I impress the voltage across resistor 13 upon azimuth gyro 81 through a capacitor 14. Upon the closing of micro-switch 8, the upper terminal of resistor 13 becomes positive relative to its lower terminal. This causes a predetermined charge to flow through capacitor 14 which rapidly slews the platform through approximately 90°. When micro-switch 8 opens, this same charge flows through capacitor 14 in the opposite direction, rapidly turning the platform back 90° approximately to its original orientation. The R-C time-constant of capacitor 14 and the resistance of the rapid slewing torquer of azimuth gyro 81 should be much smaller than the time interval between actuations of micro-switch 8. The rapid slew circuit cannot affect the steady-state operation of azimuth gyro 81, since capacitor 14 blocks a steady flow of direct current.

The component of earth rate sensed by that gyro controlling gyro-compassing is $w(\cos L)(\sin Z)$, where $Z$ is the northerly azimuthal error. The component of earth rate sensed by that gyro which does not control gyro-compassing is $w(\cos L)(\cos Z)$. It will be noted that introduced into the gyro which does not control gyro-compassing is the signal 17 which is equal to $w \cos L$. Accordingly, the drift error introduced into that gyro which does not control gyro compassing by an azimuthal error $Z$ is $w(\cos L)(1-\cos Z)$. For small angles $Z$, the quantity $(1-\cos Z)$ may be approximately expressed as:

$$Z^2/2$$

Also for small angles $Z$, $\sin Z$ is approximately equal to $Z$. If $D_0$ is the initial drift of gyro 21 and $D_1$ is the residual second-order uncompensated drift in gyro 51 and $D_2$ is the residual fourth-order drift in gyro 21 after the energization of winding 9 and $D_3$ is the residual eighth-order drift in gyro 51 after the subsequent de-energization of winding 9, and $K$ represents $w \cos L$, then:

$$D_1 = 2K(D_0/2K)^2$$
$$D_2 = 2K(D_0/2K)^4$$
$$D_3 = 2K(D_0/2K)^8$$

and in general:

$$D_n = 2K(D_0/2K)^{2n}$$

Accordingly, at the extremely high latitude of 88.1° with an initial drift $D_0$ in gyro 21 of 0.1° per hour where earth rate $w$ is equal to 15° per hour and $\cos L = \cos 88.1° = .033$, then $K = 15(.033) = 0.5$ and $2K = 1$. Hence, $$D_1 = 1(0.1°)^2 = .01° \text{ per hour}$$

This represents a ten-fold improvement over the probable initial drift in horizontal gyro 51. After switching to the lower position of the armatures by the energization of winding 9, $$D_2 = 1(0.1)^4 = .0001° \text{ per hour}$$

The drift in gyro 21 has been reduced by a factor of one thousand from its initial value. After returning to the upper positions of the armatures by de-energizing winding 9, $$D_3 = 1(0.1)^8 = .00000001° \text{ per hour}$$

The drift in gyro 51 has been reduced by a factor of ten million from its probable initial value. At lesser latitudes the convergence is so rapid that not more than one switching operation is required. After the gyros have been thus trimmed, the system may be reconnected in accordance with conventional stable platform practice. However, all three velocity servos are disabled; and the gyro drift cancelling signals appearing at the three potentiometer brushes are retained.

It will be seen that I have accomplished the objects of my invention. I have provided a completely automatic system which generates trimming signals substantially eliminating gyroscope drift. My automatic gyroscope trimming system requires no auxiliary external equipment and permits the trimming operation to be performed with the gyros mounted on the platform. The gyros may be retrimmed without the necessity of removal from the platform. The trimming operation is accomplished rapidly and expeditiously which permits of gyro retrimming each day or even more frequently as may be required.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An inertial system including in combination a first and a second and a third gyroscope, a first and a second accelerometer, a first and a second integrator, a platform, means mounting the gyroscopes and accelerometers on the platform, the third gyroscope having a vertically disposed input axis, the first and second gyroscopes having horizontally disposed orthogonal input axes, the accelerometers having horizontally disposed orthogonal sensitive axes, the input axis of the first gyroscope being disposed orthogonally to the sensitive axis of the first accelerometer, means providing a signal, means coupling the first accelerometer and the first integrator to the first gyroscope, means coupling the second accelerometer and the second integrator to the second gyroscope, a two-state device, means responsive to a first state of the device for coupling the first accelerometer to the third gyroscope and for aplying the signal to the second gyroscope and for coupling the second accelerometer to the second integrator, and means responsive to the second state of the device for coupling the second accelerometer to the third gyroscope and for applying the signal to the first gyroscope and for coupling the first accelerometer to the first integrator.

2. An inertial system as in claim 1 including means responsive to a change in state of the device for applying to the third gyroscope a momentary signal having such time integral as to torque the platform rapidly through substantially 90°.

3. An inertial system as in claim 1 including means for nulling the first integrator.

4. An inertial system as in claim 1 including means for causing the device to alternate periodically between states.

5. An inertial system including in combination a first and a second and a third gyroscope, a first and a second accelerometer, a platform, means mounting the gyroscopes and accelerometers on the platform, the third gyroscope having a vertically disposed input axis, the first and second gyroscopes having horizontally disposed orthogonal input axes, the accelerometers having horizontally disposed orthogonal sensitive axes, the input axis of the first gyroscope being disposed orthogonally to the sensitive axis of the first accelerometer, a first and a second integrator, means providing a signal, means coupling the first accelerometer to the first integrator and to the first gyroscope, means coupling the first integrator to the first gyroscope, means coupling the second accelerometer to the second integrator and to the second gyroscope, means coupling the second integrator to the second gyroscope, a two-state device, means responsive to a first state of the device for coupling the first accelerometer to the third gyroscope and for applying the signal to the second gyroscope and for disabling the first integrator, and means responsive to the second state of the device for coupling the second accelerometer to the third gyroscope and for applying the signal to the first gyroscope and for disabling the second integrator.

6. An inertial system as in claim 5 including means responsive to a change in state of the device for applying to the third gyroscope a momentary signal having such time integral as to torque the platform rapidly through substantially 90°.

7. An inertial system as in claim 5 including means for nulling the first integrator.

8. An inertial system as in claim 5 including means for causing the device to alternate periodically between states.

9. A three-axis inertial stabilizing system including in combination a platform, first means comprising a first integrator for rotationally stabilizing the platform about a first axis, second means comprising a second integrator for rotationally stabilizing the platform about a second axis, third means for rotationally stabilizing the platform about a third axis, the three axes being orthogonally disposed and the third axis being vertically disposed, means providing a signal, a two-state device, means responsive to a first state of the device for coupling the first means to the third means and for applying the signal to the second means and for disabling the first integrator, and means responsive to the second state of the device for coupling the second means to the third means and for applying the signal to the first means and for disabling the second integrator.

10. An inertial system as in claim 9 including means responsive to a change in state of the device for rotating the platform rapidly through substantially 90° about the third axis.

11. An inertial system as in claim 9 including means for nulling the first integrator.

12. An inertial system as in claim 9 including means for causing the device to alternate periodically between states.

13. An inertial platform system including in combination a first and a second and a third single-degree-of-freedom gyroscope each having an input axis and a torquer and providing a gimbal-angle output, a first and a second accelerometer each having a sensitive axis and providing an output, a first and a second and a third integrator each having an input and providing an output, means providing a first signal equal to $w \sin L$ and a second signal equal to $w \cos L$, where $w$ is the constant rate of rotation of the earth and where L is latitude, a platform having a datum plane, means mounting the gyroscopes and accelerometers on the platform, the input axes of the first and second gyroscopes and the sensitive axes of the accelerometers being disposed parallel to the datum plane, the input axis of the third gyroscope being disposed orthogonally to the datum plane, the input axis of the first gyroscope being orthogonally disposed to the sensitive axis of the first accelerometer, the input axes of the first and second gyroscopes being orthogonally disposed, the sensitive axes of the accelerometers being orthogonally disposed, means responsive to the respective outputs of the first and second and third gyroscopes for controlling rotation of the platform about the respective input axes of the first and second and third gyroscopes, a two-state device, means coupling the output of the first accelerometer and the output of the first integrator to the torquer of the first gyroscope, means coupling the output of the second accelerometer and the output of the second integrator to the torquer of the second gyroscope, means coupling the input and the output of the third integrator and the first signal to the torquer of the third gyroscope, means responsive to a first state of the device for coupling the output of the first accelerometer to the input of the third integrator and for applying the second signal to the torquer of the second gyroscope and for coupling the output of the second accelerometer to the input of the second integrator, and means responsive to the second state of the device for coupling the output of the second accelerometer to the input of the third integrator and for applying the second signal to the torquer of the first gyroscope and for coupling the output of the first accelerometer to the input of the first integrator.

14. An inertial platform system as in claim 13 including means responsive to a change in state of the device for applying to the torquer of the third gyroscope a momentary signal having such time integral as to rotate the platform rapidly through substantially 90°.

15. An inertial platform system as in claim 13 including means for nulling the output of the first integrator.

16. An inertial platform system as in claim 13 including means for causing the device to alternate periodically between states.

17. An inertial platform trimming system including in combination a platform provided with two single-degree-of-freedom gyroscopes having orthogonally disposed input axes lying in a horizontal plane, a two-state device, means responsive to a first state of the device for azimuthally orienting the platform such that the input axis of a first gyroscope is aligned with north and for trimming the first gyroscope, and means responsive to second state of the device for azimuthally orienting the platform such that the input axis of the second gyroscope is aligned with north and for trimming the second gyroscope.

18. An inertial platform trimming system as in claim 17 including means for causing the device to alternate periodically between states.

19. An inertial platform trimming system including in combination a platform having a datum plane and a reference line in the datum plane, means for rotationally stabilizing the platform such that the datum plane is horizontal, a two-state device, means for providing a first and a second trimming signal, means applying said signals to the stabilizing means, means responsive to a first state of the device for azimuthally orienting the platform such that the reference line is aligned with a certain true direction and for varying the first signal and for maintaining the second signal constant, and means responsive to the second state of the device for changing the azimuthal orientation of the platform by 90° and for varying the second signal and for maintaining the first signal constant.

20. An inertial platform trimming system as in claim 19 including means for causing the device to alternate periodically between states.

21. An inertial platform trimming system including in combination a platform provided with a single-degree-of-freedom gyroscope having an input axis disposed in a horizontal plane, a two-state device, means for providing a trimming signal, means applying the signal to the gyroscope, means responsive to a first state of the device for azimuthally orienting the platform such that the input axis is aligned with north and for varying the signal, and means responsive to the second state of the device for changing the azimuthal orientation of the platform by 90° and for maintaining the signal constant.

22. An inertial platform trimming system as in claim 21 including means for causing the device to alternate periodically between states.

References Cited
UNITED STATES PATENTS 3,241,363  3/1966  Alderson et al.

FOREIGN PATENTS 1,315,998  12/1962  France.
956,264  4/1964  Great Britain.

ROBERT B. HULL, *Primary Examiner.*